(12) United States Patent
Medvedev et al.

(10) Patent No.: US 6,181,476 B1
(45) Date of Patent: Jan. 30, 2001

(54) LIGHT COLLIMATING AND DISTRIBUTING APPARATUS

(75) Inventors: Vladimir Medvedev, El Segundo; William A. Parkyn, Jr., Lomita, both of CA (US)

(73) Assignee: Teledyne Lighting and Display Products, Inc., Hawthorne, CA (US)

( * ) Notice: Under 35 U.S.C. 154(b), the term of this patent shall be extended for 0 days.

(21) Appl. No.: 09/359,620

(22) Filed: Jul. 22, 1999

(51) Int. Cl.[7] .................................. G02B 27/30; G02B 27/10
(52) U.S. Cl. ................................................ 359/641; 359/618
(58) Field of Search ................................. 359/618, 629, 359/708, 726, 727, 742, 748

(56) References Cited

U.S. PATENT DOCUMENTS

| | | | |
|---|---|---|---|
| 4,770,514 | * 9/1988 | Silvergate | 359/728 |
| 5,577,493 | 11/1996 | Parkyn, Jr. et al. | 126/699 |
| 5,757,557 | 5/1998 | Medvedev et al. | 359/708 |
| 5,926,320 | * 7/1999 | Parkyn, Jr. et al. | 359/641 |

* cited by examiner

Primary Examiner—Ricky Mack
(74) Attorney, Agent, or Firm—William W. Haefliger

(57) ABSTRACT

In a device for directing light longitudinally forwardly, the combination comprises a light source; a drum lens having a body extending about the light source, for refracting light from the source; a light reflector extending about the drum lens body for forwardly re-directing refracted light received from the drum lens body, the drum lens and reflector defining a longitudinally forwardly extending optical axis; and including an aspheric lens located longitudinally forwardly of the light source to refract light received from a source to be transmitted in a forward direction.

13 Claims, 3 Drawing Sheets

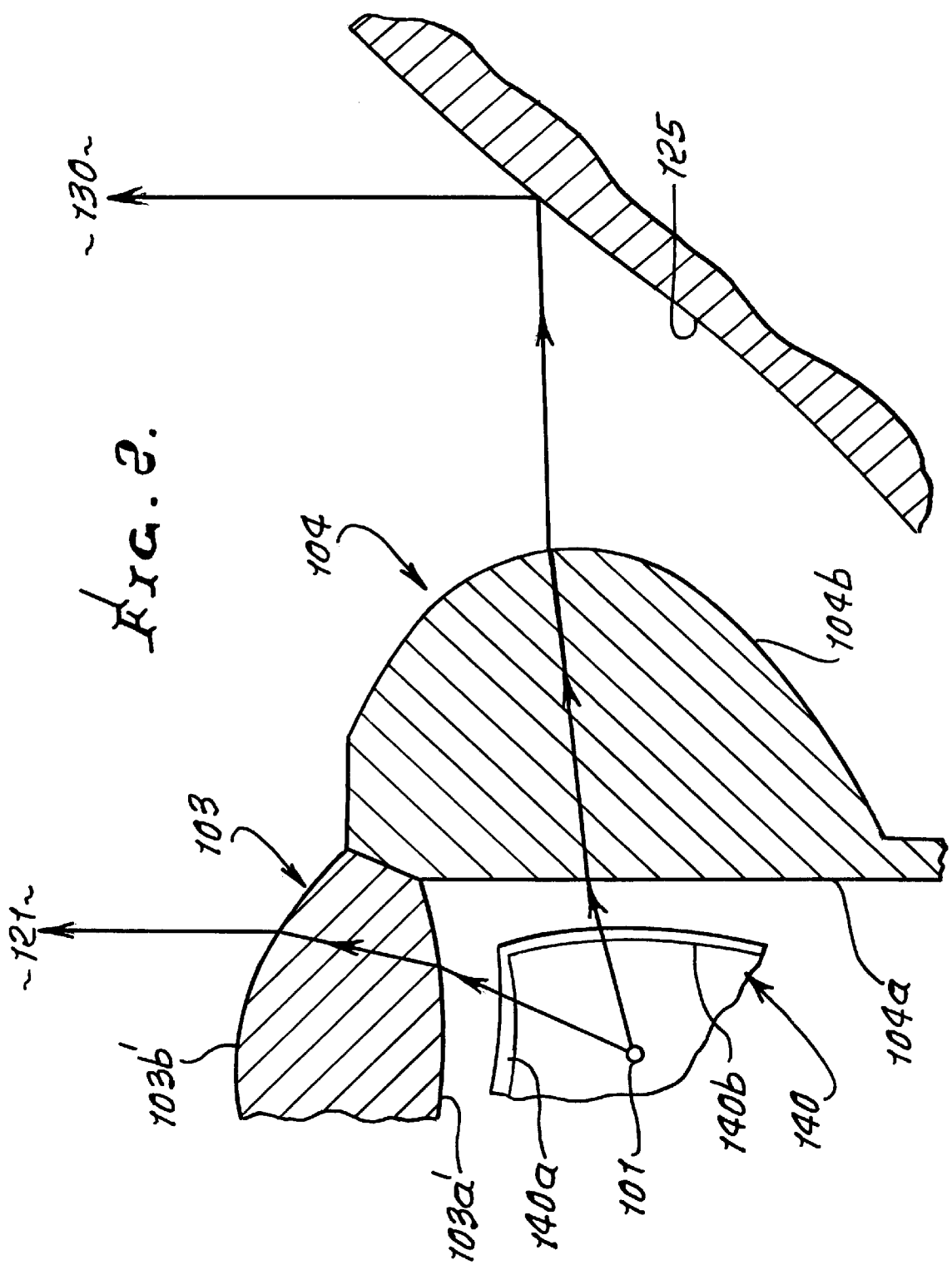

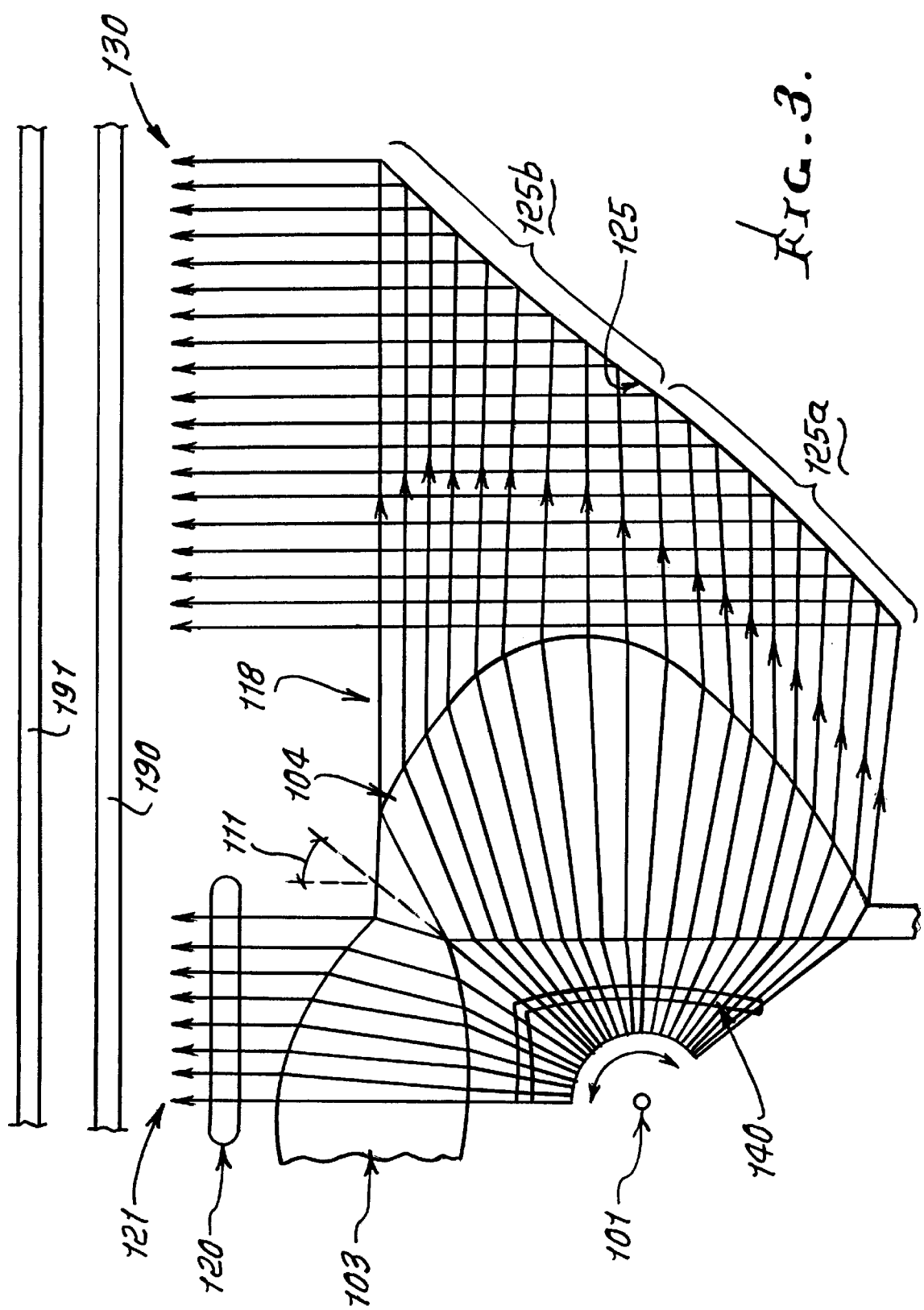

LIGHT COLLIMATING AND DISTRIBUTING APPARATUS

BACKGROUND OF THE INVENTION

This invention relates generally to efficient illumination of targets, as for example screens, such as liquid crystal displays.

There is need for devices of the type disclosed herein, and in particular for uniform illumination of targets, using compact high-brightness light sources. Also, there is need for light collimating devices that have minimum lens and reflector total depth, along the optical axis, and with maximum interception of light from a central source.

SUMMARY OF THE INVENTION

It is a major object of the invention to provide an improved device of the type referred to and comprising, in combination:

a) a light source, b) a drum lens having a body extending about the light source, for refracting light from the source, c) a light reflector extending about the drum lens body, for forwardly re-directing refracted light received from the drum lens body, d) the drum lens and reflector defining a longitudinally forwardly extending optical axis, e) and including an aspheric lens located longitudinally forwardly of the light source to refract light received from said source to be transmitted in a forward direction.

As will be seen, the optical axis centrally intersects the aspheric lens.

It is a further object of the invention to provide a protective, transparent envelope extending about the light source, the drum lens extending laterally about the envelope, and the aspheric lens extending longitudinally forwardly of the envelope to receive light from the source via the envelope and to collimate such light. The aspheric lens may be integral with the drum lens, with a forwardly facing land located between the drum lens and the aspheric lens.

Yet another object is to provide such an aspheric lens with an inner surface longitudinally facing the envelope, the inner surface having rearward convexity, and the aspheric lens also having an outer surface longitudinally facing away from the envelope, that outer surface having forward convexity which exceeds the convexity of the inner surface.

An additional object is to provide a local juncture between the drum lens and the aspheric lens, and located to separate light refracted by the drum lens and the aspheric lens, whereby a gap is formed between light refracted by the aspheric lens and light reflected by the reflector. As will be seen, the drum lens may advantageously have an inner substantially cylindrical surface intercepting an edge defined by said aspheric lens inner surface. Also, the drum lens may have an outer outwardly convex surface terminating outwardly of an edge defined by the aspheric lens outer surface.

A yet further object is to provide a target spaced forwardly of the aspheric lens and reflector, the target positioned to receive collimated light via the aspheric lens and reflector. The target may advantageously comprise a liquid crystal display.

A related U.S. application is Ser. No. 08/864,840, now U.S. Pat. No. 5,926,320, filed May 29, 1997.

These and other objects and advantages of the invention, as well as the details of an illustrative embodiment, will be more fully understood from the following specification and drawings, in which:

DRAWING DESCRIPTION

FIG. 2 is a view like FIG. 1 but also showing a modified aspheric lens; and

FIG. 3 is a view like FIG. 1, but also showing a corrective lens.

DETAILED DESCRIPTION

Figure 1:
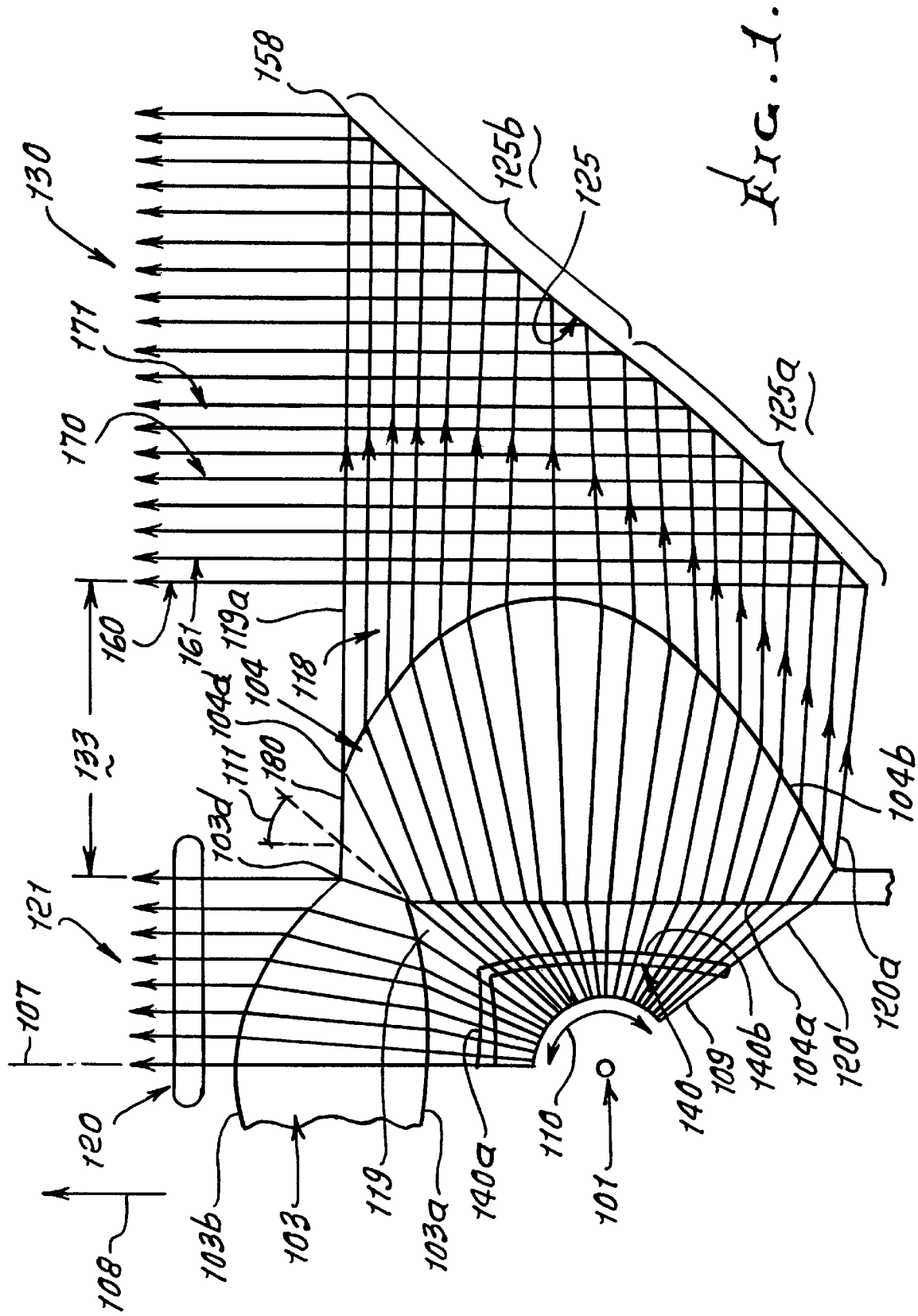
FIG. 1 is a view in section of a light source, drum lens, and reflector, incorporating the invention.

In FIG. 1, a light source 101 is shown as radiating light over an angular range 110, as defined between an optical axis 107 extending forwardly in direction 108, and a rearwardly and laterally extending ray 109. The source may comprise a plasma lamp.

A central aspheric lens 103 is located forwardly, i.e. above, the source, and axis 107 centrally intersects lens 103, which extends about axis 107. That lens has an inner rearwardly convex surface indicated at 103a, and an outer, forwardly convex surface indicated at 103b. In a plane normal to that of FIG. 1, and passing through axis 107, the surfaces 103a and 103b may have curvatures 103a' and 103b' different from those seen in FIG. 1. See FIG. 2 in this regard, showing less curvatures at 103a' and 103b' than exist at surfaces 103a and 103b, the curvatures gradually changing between the FIG. 1 and FIG. 2 planes. Another possible aspheric lens has curvatures of surfaces as in either of FIGS. 1 and 2 which are not spherical, but which are surfaces of revolution about the optical axis. The light rays in bundle 120 that are refracted by lens 103 are collimated into central beam 121.

Also shown in FIGS. 1 and 2 is a drum lens 104 having a body located sidewardly, or laterally of the light source and the optical axis. The drum lens body also extends about the light source and the optical axis, for refracting light from the source, the refracted light rays indicated at 118. The drum lens has an inner generally cylindrical surface seen at 104a, and an outer, outwardly convex outer surface 104b, that surface also being convex in planes normal to the optical axis and intersecting the surface 104b. The refracted rays are compressed, (compare the relatively larger angle formed between uppermost and lowermost rays 119 and 120 entering surface 104a, with the relatively reduced angle formed between corresponding uppermost and lowermost rays 119a and 120a exiting drum lens surface 104b).

The rays exiting surface 104b, pass to a reflector 125 that extends annularly about the optical axis, and the rays are reflected forwardly to form the outer annular beam 130, with uniform illuminance and therefore constant angular beam width and maximal collimation. Efficient collimation with minimum lens system depth are also provided. Annular gap 133 exists between beams 130 and 121.

The surface line of the reflector 125 has a hallow outward facing S-shape, in the plane of FIG. 1 (i.e. with shallow convexity at 125a, and shallow concavity at 125b. The annular areas between successive collimated rays, as at 160 and 161, and 170 171, for example are equal. The reflector edge 158 may have a substantially rectangular or square outline in planes normal to FIG. 1.

The device may be provided with a protective transparent envelope or shell 140 extending about the light source. See envelope end wall 140a through which light rays pass to the lens 103, and envelope side wall 140b through which light rays pass to the drum lens.

The aspheric lens 103 and the drum lens may be integral, or of unitary construction; and a forwardly facing flat land 180 is formed between the outermost edge 103*d* of lens 103, and the uppermost edge 104*d* of lens 104. That land may have lateral length that varies with the curvature of the lens surface 103*b*.

A correction lens 190 may be located forwardly of the lenses 103 and 104, as seen in FIG. 3, i.e. between the latter lenses and a target 191. The target may consist of a liquid crystal display (LCD).

The system with correction lens has a non-circularly symmetric version, wherein the cross-section in FIG. 1 varies somewhat with azimuth angle about the source. For example, typical LCDs have a 4:3 aspect ratio, so that they intercept only 61% of the circular output beam. Thus the rectangular output from a non-circularly symmetric version of the system will have greatly increased output illuminance.

The transparent material of the lenses and envelope may consist of glass or plastic.

The device as shown and described may be regarded as a preferred form.

We claim:

1. In a device for directing light longitudinally forwardly, the combination comprising:
   a) a light source,
   b) a drum lens having a body extending about the light source, for refracting light from the source,
   c) a light reflector extending about the drum lens body for forwardly re-directing refracted light received from the drum lens body,
   d) said drum lens and reflector defining a longitudinally forwardly extending optical axis,
   e) and including an aspheric lens located longitudinally forwardly of the light source to refract light received from said source to be transmitted in a forward direction.

2. The combination of claim 1 wherein said optical axis centrally intersects said aspheric lens.

3. The combination of claim 1 including a protective, transparent envelope extending about the light source, said drum lens extending laterally about said envelope, and said aspheric lens extending longitudinally forwardly of the envelope to receive light from the source via the envelope and to collimate said light.

4. The combination of claim 1 wherein the aspheric lens is integral with the drum lens, there being a forwardly facing land located between the drum lens and the aspheric lens.

5. The combination of claim 3 wherein the aspheric lens has an inner surface longitudinally facing the envelope, said inner surface having rearward convexity, and said aspheric lens has an outer surface longitudinally facing away from the envelope, said outer surface having forward convexity which exceeds the convexity of said inner surface.

6. The combination of claim 3 wherein there is a local juncture between the drum lens and the aspheric lens, and located to separate light refracted by the drum lens and the aspheric lens, whereby a gap is formed between light refracted by the aspheric lens and light reflected by the reflector.

7. The combination of claim 5 wherein the drum lens has an inner substantially cylindrical surface intercepting an edge defined by said aspheric lens inner surface.

8. The combination of claim 7 wherein said drum lens has an outer outwardly convex surface terminating outwardly of an edge defined by said aspheric lens outer surface.

9. The combination of claim 1 including a target spaced forwardly of said aspheric lens and said reflector, said target positioned to receive collimated light via said aspheric lens and said reflector.

10. The combination of claim 7 including a target spaced forwardly of said aspheric lens and reflector, said target positioned to receive uniformly collimated light via said aspheric lens and reflector.

11. The combination of claim 9 wherein said target comprises a liquid crystal display.

12. The combination of claim 10 wherein said target comprises a liquid crystal display.

13. The combination of claim 1 wherein the source is a plasma lamp.

\* \* \* \* \*